J. F. S. GOBLE.
CLAMPING DEVICE FOR GRINDING LAWN MOWERS.
APPLICATION FILED FEB. 19, 1909.

960,163.

Patented May 31, 1910.

Witnesses
Frank B. Hoffman

Inventor
James F. S. Goble
By Victor J. Evans
Attorney

UNITED STATES PATENT OFFICE.

JAMES F. S. GOBLE, OF NEW ALBIN, IOWA.

CLAMPING DEVICE FOR GRINDING LAWN-MOWERS.

960,163.  Specification of Letters Patent.  Patented May 31, 1910.

Application filed February 19, 1909. Serial No. 478,790.

*To all whom it may concern:*

Be it known that I, JAMES F. S. GOBLE, a citizen of the United States of America, residing at New Albin, in the county of Allamakee and State of Iowa, have invented new and useful Improvements in Clamping Devices for Grinding Lawn-Mowers, of which the following is a specification.

This invention relates to devices for grinding lawn mowers, and one of the principal objects of the same is to provide simple and efficient means for holding a lawn mower in position to quickly grind the blades and mower plate against which the blades contact during the operation of the machine.

The various lawn mowers in present use have wheels of different contours. Some of these wheels are provided with spokes, while others are practically solid. In order to provide a clamping device for a grinding mechanism which may be connected to wheels of various contours an interchangeable clamping device must be provided, and one of the principal objects of my invention is to provide a clamping device for carrying a crank bar which can be quickly attached to any form of lawn mower wheel. These and other objects may be attained by means of the construction illustrated in the accompanying drawing, in which,—

Figure 1:
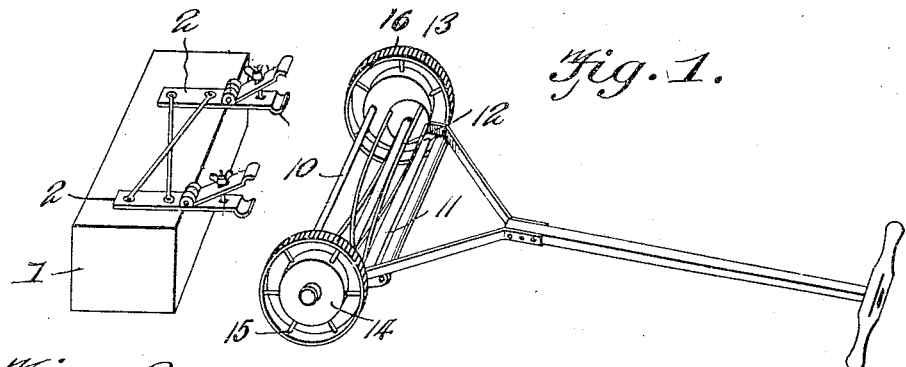
Figure 3:
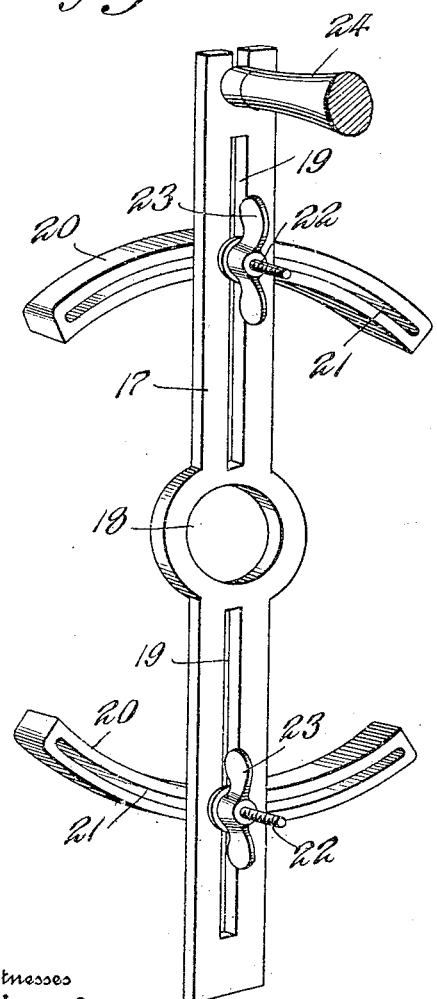
Figure 2:
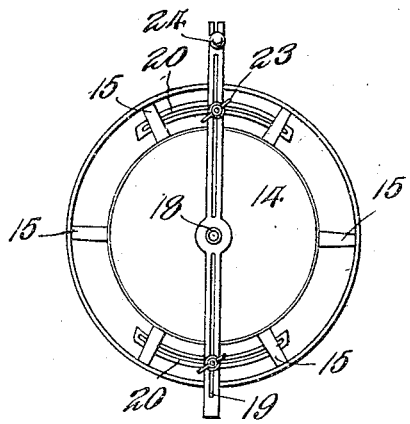

Figure 1 is a perspective view of a lawn mower and a grinding stand therefor. Fig. 2 is an end view of one of the wheels and showing one of my clamping devices secured thereto in position for rotating said wheel and the cutter bars of the lawn mower. Fig. 3 is an enlarged perspective view of the clamp and crank bar shown in Fig. 2.

Referring to the drawing, the numeral 1 designates a base or stand to the top of which are connected two clamps 2, which may be of any suitable and appropriate construction. The clamps are adapted to engage the cross rod 10 of the lawn mower, thus holding the mower bar or roller 11 in such position that the abrading material or paste applied thereto will sharpen the blades 12 when they are revolved by means of the attachment about to be described.

The wheels 13 of the lawn mower shown in Fig. 1 are provided with a hub or disk 14 having radial spokes 15 formed integral with the periphery or band 16 of the wheel. In order to clamp a wheel of this construction I have provided the crank bar 17 having a central opening 18 which fits over the end of the projecting axle or hub of the wheel, said bar being provided with elongated slots 19, one at each side of the central opening 18. Curved clamping members 20 provided with arcuate slots 21 are connected to the bar 17 by means of suitable headed bolts 22 and winged nuts 23. A crank handle 24 is connected to the bar 17. The curved clamp members 20 are connected to the wheel 13 by extending the opposite ends of said members underneath the spokes 15, as shown in Fig. 2, and by then tightening up the winged nuts 23. In this position the wheels 13 and the cutter bars 12 are rapidly rotated by means of the handle 24 to bring the cutter bars into contact with the lower bar 11.

I claim:—

In a device of the character described, a crank bar adapted to be fitted to the hub of a lawn mower wheel for turning the axle in grinding the cutters, said bar having a centrally enlarged portion provided with an opening and oppositely disposed longitudinal slots, curved clamps, each provided with a curved slot, screws and thumb nuts for adjustably securing the curved clamps to said bar, said screws extending through the longitudinal slots in the bar, and a crank handle provided with means for adjustably connecting the same to a slot in the end of said bar.

In testimony whereof I affix my signature in presence of two witnesses.

JAMES F. S. GOBLE.

Witnesses:
H. GILBERT MAY,
W. O. BOCK.